United States Patent
Kobayashi et al.

(10) Patent No.: US 6,174,966 B1
(45) Date of Patent: Jan. 16, 2001

(54) COATING AGENT COMPOSITION, METHOD OF PREPARING SAME, AND COATING MATERIAL

(75) Inventors: Hideki Kobayashi; Toru Masatomi, both of Chiba Prefecture (JP)

(73) Assignees: Dow Corning Toray Silicone Co., Ltd.; Dow Corning Corporation

( * ) Notice: Under 35 U.S.C. 154(b), the term of this patent shall be extended for 0 days.

(21) Appl. No.: 09/301,258

(22) Filed: Apr. 28, 1999

(30) Foreign Application Priority Data

Apr. 28, 1998 (JP) .................................. 10-134515

(51) Int. Cl.⁷ .................................................. C08G 18/44
(52) U.S. Cl. .......................... 525/464; 525/418; 556/482; 528/196; 528/219; 528/272
(58) Field of Search ............................ 556/482; 525/418, 525/464; 528/196, 219, 272

(56) References Cited

FOREIGN PATENT DOCUMENTS

| 51-148749 | 12/1976 | (JP) | ................................ C08L/83/06 |
| 58-109062 | 6/1983 | (JP) | ................................ A61M/1/03 |

*Primary Examiner*—Robert Dawson
*Assistant Examiner*—Kuo-Liang Peng
(74) *Attorney, Agent, or Firm*—Larry A. Milco

(57) ABSTRACT

A coating agent composition, comprising (A) 100 parts by weight of a polymer having at least two alkoxysilyl groups, wherein the polymer has a number average molecular weight of 500 to 500,000, the polymer has a principal chain comprising a polycarbonate or a polyarylate, and the alkoxysilyl groups in the polymer have the formula $-SiR_{3-a}(OR')_a$, wherein R is a substituted or unsubstituted monovalent hydrocarbon group having 1 to 10 carbon atoms, R' is a substituted or unsubstituted monovalent hydrocarbon group having 1 to 8 carbon atoms, and a is from 1 to 3; (B) 50 to 2,000 parts by weight of an organic solvent; (C) 1 to 90 parts by weight of an organosilane, wherein the organosilane is a compound having the formula $R''_e SiY_{4-e}$ or a partially hydrolyzed condensate thereof, wherein R" is a substituted or unsubstituted monovalent hydrocarbon group or a hydrogen atom, Y is a hydrolyzable group, and e is from 0 to 2; and (D) a cure catalyst in an amount sufficient to cure the composition. A method of preparing a coating agent composition and a coating agent prepared by curing the composition.

17 Claims, No Drawings

COATING AGENT COMPOSITION, METHOD OF PREPARING SAME, AND COATING MATERIAL

FIELD OF THE INVENTION

The present invention relates to a coating agent composition, and more particularly to a coating agent composition containing a polymer having alkoxysilyl groups and a principal chain comprising a polycarbonate or a polyarylate. The present invention is also directed to a method of preparing the coating agent composition and to a coating material prepared therefrom.

BACKGROUND OF THE INVENTION

Numerous compositions have been proposed as organopolysiloxane compositions which form cured coating films at room temperature. For example, a composition consisting of a hydroxy group-containing organopolysiloxane resin, organoalkoxysilanes and an organic solvent has been proposed in Japanese Patent Application Kokai No. 51-148749. However, cured coating films produced from a composition consisting chiefly of this type of organopolysiloxane resin are inferior in terms of wear resistance, and are unsuitable for some applications.

Furthermore, polycarbonates and polyarylates are known as coating agents, and are widely used in optical applications, etc. For example, a medical material containing a polycarbonate with cross-linkable silyl groups as an active ingredient has been proposed (see Japanese Patent Application Kokai No. 58-109062). However, cured coating films produced from compositions containing a polycarbonate with cross-linkable silyl groups have inferior water-repellent properties, and, therefore, cannot be used in some applications.

SUMMARY OF THE INVENTION

The present invention is directed to a coating agent composition comprising:

(A) 100 parts by weight of a polymer having at least two alkoxysilyl groups, wherein the polymer has a number average molecular weight of 500 to 500,000, the polymer has a principal chain comprising a polycarbonate or a polyarylate, and the alkoxysilyl groups in the polymer have the formula:

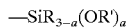

wherein R is a substituted or unsubstituted monovalent hydrocarbon group having 1 to 10 carbon atoms, R' is a substituted or unsubstituted monovalent hydrocarbon group having 1 to 8 carbon atoms, and a is from 1 to 3;

(B) 50 to 2,000 parts by weight of an organic solvent;
(C) 1 to 90 parts by weight of an organosilane, wherein the organosilane is a compound having the formula $R''_e SiY_{4-e}$ or a partially hydrolyzed condensate thereof, wherein R'' is a substituted or unsubstituted monovalent hydrocarbon group or a hydrogen atom, Y is a hydrolyzable group, and e is from 0 to 2; and
(D) a cure catalyst in an amount sufficient to cure the composition.

The present invention is also directed to a method of preparing a coating agent composition, comprising mixing Components (A) to (D) above.

The present invention is further directed to a coating material prepared by curing the aforementioned coating agent composition.

DETAILED DESCRIPTION OF THE INVENTION

Component (A) of the present invention is a polymer having at least two alkoxysilyl groups. The alkoxysilyl groups may be located at pendant and/or terminal positions in the polymer. The polymer also has a number average molecular weight of 500 to 500,000 and has a principal chain comprising a polycarbonate or a polyarylate. The alkoxysilyl groups in component (A) have the formula:

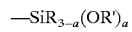

wherein R is a substituted or unsubstituted monovalent hydrocarbon group having 1 to 10 carbon atoms, R' is a substituted or unsubstituted monovalent hydrocarbon group having 1 to 8 carbon atoms, and a is from 1 to 3. Such alkoxysilyl groups are ordinarily bonded to carbon atoms in component (A). Alternatively, the alkoxysilyl groups may be bonded to silicon atoms in component (A) through siloxane bonds. In other words, the alkoxysilyl groups may be bonded to the principal chains in the polymer via siloxane bonds.

As stated above, the principal chain of component (A) can comprise a polycarbonate. The constituent units of the polycarbonates include constituent units having the formula:

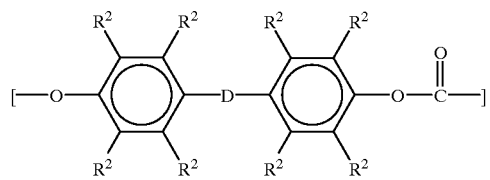

wherein $R^2$ is selected from the group consisting of hydrogen atoms, halogen atoms, monovalent hydrocarbon groups having 1 to 4 carbon atoms, and monovalent hydrocarbon groups having 1 to 4 carbon atoms and containing at least one alkoxysilyl group; and D is selected from the group consisting of divalent hydrocarbon groups having 1 to 20 carbon atoms, —O—, —S—, —CO—, —SO$_2$—, and divalent hydrocarbon groups having 1 to 20 carbon atoms and containing at least one alkoxysilyl group.

Examples of monovalent hydrocarbon groups represented by $R^2$ include, but are not limited to, alkyl groups, such as methyl, ethyl, propyl, and butyl; and alkenyl groups, such as vinyl and allyl. Preferably, at least 50% of the groups denoted by $R^2$ are hydrogen atoms.

Concrete examples of divalent hydrocarbon groups represented by D include alkylidene, aryl-substituted alkylidene, alkylene, cycloalkylene, arylene, and groups formed by bonding between any of the preceding groups. The structure of the alkylidene groups may be linear, branched or cyclic.

Polycarbonates having the aforementioned structure can be prepared by reacting phosgene, a carbonic acid diester or a polycarbonate oligomer with a dihydric phenol compound having the formula:

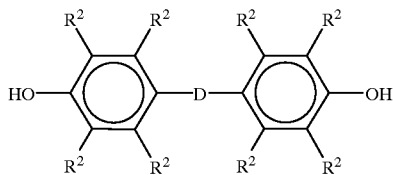

wherein $R^2$ and D are as defined above.

Examples of such dihydric phenol compounds include bis(4-hydroxyphenyl)methane, bis(4-hydroxyphenyl)ether, bis(4-hydroxyphenyl)sulfone, bis(4-hydroxyphenyl) sulfoxide, bis(4-hydroxyphenyl)sulfide, bis(4-hydroxyphenyl)ketone, 1,1-bis(4-hydroxyphenyl)ethane, 2,2-bis(4-hydroxyphenyl)propane, 2,2-bis(4-hydroxyphenyl)hexafluoropropane, 2,2-bis(4-hydroxyphenyl)butane, 1,1-bis(4-hydroxyphenyl) cyclohexane, 2,2-bis(4-hydroxy-3,5-dibromophenyl) propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3,5-diemthylphenyl)propane, 1,1-bis(4-hydroxyphenyl)-1-phenylethane and bis(4-hydroxyphenyl)diphenylmethane. Among these, 2,2-bis(4-hydroxyphenyl)propane and 1,1-bis (4-hydroxyphenyl)cyclohexane are especially desirable.

Also, as stated above, the principal chains of component (A) can comprise a polyarylate. The constituent units of the polyarylate include consituent units having the formula:

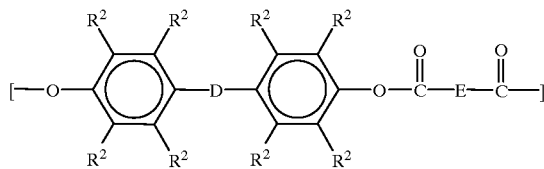

wherein $R^2$ and D are as defined above, and E is a substituted or unsubstituted divalent hydrocarbon group having 1 to 20 carbon atoms or a divalent hydrocarbon group having 1 to 20 carbon atoms and containing at least one alkoxysily group, provided at least 50 mole % of the groups denoted by E are aromatic hydrocarbon groups.

Examples of aromatic hydrocarbon groups represented by E include ortho-phenylene, meta-phenylene, para-phenylene, naphthylene, and diphenylenealkane. Examples of divalent hydrocarbon groups other than aromatic groups include alkylene groups, cycloalkylene groups and halogen-substituted alkylene or cycloalkylene groups. Polyarylate having the aforementioned structure can be prepared, for example, by reacting the aforementioned dihydric phenol compounds with aromatic dicarboxylic acids. Reaction methods which can be used include ordinary melt polymerization methods, interfacial polymerization methods, solution polymerization methods, and other common polymerization methods.

Component (A) of the present invention can be prepared by reacting an alkoxysilane containing silicon-bonded hydrogen atoms, having the formula:

$HSiR_{(3-a)}(OR')_a$ wherein R and R' are as defined above and a is from 1 to 3, with a polycarbonate or a polyarylate having unsaturated groups selected from the group consisting of alkenyl, alkenyloxy, alkynyl, and alkynyloxy. The unsaturated groups can be located at pendant and/or terminal positions in the polycarbonate or polyarylate.

Examples of alkenyl groups include vinyl, allyl, and 5-hexenyl. Examples of alkynyl groups include ethynyl. Examples of alkenyloxy groups include vinyloxy, allyloxy, 5-hexenyloxy. Examples of alkynyloxy groups include ethynyloxy.

Examples of alkenyl group-containing polymers suitable for use as component (A) in the present composition include polymers prepared by polymerizing 2,2-bis(2-allyl-4-hydroxyphenyl)propane or 2,2-bis(3-allyl-4-hydroxyphenyl)propane.

Component (B) of the present invention is an organic solvent, which is used to disperse or dissolve component (A). Component (B) can be any organic solvent which volatilizes during coating. Examples of organic solvents include chlorinated hydrocarbons such as dichloromethane, 1,2-dichloroethane, 1,1,2,2-tetrachloroethane, chloroform, 1,1,1-trichloroethane, carbon tetrachloride, monochlorobenzene and dichlorobenzene; aromatic hydrocarbons such as benzene, toluene, xylene and ethylbenzene; ether compounds such as diethyl ether and tetrahydrofuran; ketone solvents such as methyl isobutyl ketone; fluorinated solvents such as α, α, α-trifluorotoluene and hexafluoroxylene; and volatile silicones such as hexamethyldisiloxane, hexamethylcyclotrisiloxane and octamethylcyclotetrasiloxane. Component (B) can also be a mixture comprising two or more or the aforementioned organic solvents.

The amount of component (B) in the composition of the present invention is typically from 50 to 2,000 parts by weight and preferably from 100 to 1,000 parts by weight, per 100 parts by weight of component (A). If the amount of component (B) is less than 50 parts by weight, the viscosity of the composition becomes excessively high and handling becomes difficult. On the other hand, if the amount of component (B) exceeds 2,000 parts by weight, it becomes difficult to form a coating film.

Component (C) of the present invention is an organosilane having the formula:

$R''_e SiY_{4-e}$, or a partially hydrolyzed condensate thereof, wherein R" is a substituted or unsubstituted monovalent hydrocarbon group or a hydrogen atom, Y is a hydrolyzable group, and e is from 0 to 2. Preferably, e has a value of 1. Component (C), which functions as a cross-linking agent in the presence of moisture, can be a single organosilane, a partially hydrolyzed condensate thereof, or a mixture of two or more such compounds.

Examples of unsubstituted monovalent hydrocarbon groups represented by R" include alkyl such as methyl, ethyl, propyl, tert-butyl, 2-ethylhexyl, dodecyl, and octadecyl; alkenyl such as vinyl and allyl; and aryl such as phenyl and naphthyl. Among these groups, alkyl groups and alkenyl groups are preferred, and methyl groups are particularly preferred.

Examples of substituted monovalent hydrocarbon groups represented by R" include halogenated alkyl groups such as chloromethyl, 3,3,3-trifluoropropyl, and 3,3,4,4,5,5,5-heptafluoropentyl; amino functional groups such as 3-aminopropyl, γ-(2-amnoethyl)aminopropyl, and 3-anilinopropyl groups; epoxy functional groups such as 3-glycidoxypropyl; and 3-methacryloxypropyl.

Examples of hydrolyzable groups represented by Y include alkoxy such as methoxy and ethoxy; diorganoketooxime such as dimethylketooxime and methylethylketooxime; acyloxy such as acetoxy; organoamino such as N-butylamino; organoacylamide such as methylacetamide;

N,N-diorganohydroxyamino such as N,N-diethylhydroxyamino; and alkenyloxy such as propenoxy.

The amount of Component (C) in the composition of the present invention is typically from 1 to 90 parts by weight and preferably from 1 to 60 parts by weight, per 100 parts by weight of component (A).

Specific examples of Component (C) of the present invention include the following alkylalkoxysilane and silane coupling agents: $CH_3Si(OCH_3)_3$, $C_6H_5Si(OCH_3)_3$, $NH_2CH_2CH_2Si(OC_2H_5)_3$, $NH_2CH_2CH_2NH(CH_2)_3Si(OCH_3)_3$, $CH_2=CHSi(OCH_3)_3$, $CH_2=CHSi(OC_2H_5)_3$, $CH_2=CHSi(OOCCH_3)_3$, $HS(CH2)_3Si(OCH_3)_3$, $CH_2=C(CH_3)Si(OCH_3)_3$,

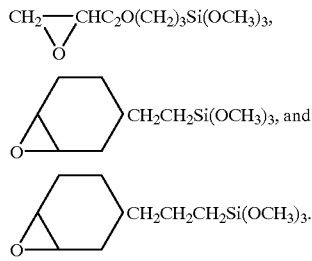

Component (D) of the present invention is a cure catalyst that accelerates curing of the composition. Condensation reaction accelerating catalysts which are commonly used in the dehydration-condensation of silanol groups may be effectively used as the cure catalyst. Examples of such catalysts include tin salts of carboxylic acids such as dibutyltin diacetate, dibutyltin dilaurate, dibutyltin dioctoate, stannous octoate, stannous naphthenate, stannous oleate, stannous isobutyrate, stannous linolate, stannous stearate, stannous benzolate, stannous naphthoate, stannous laurate, stannous o-thymate, stannous β-benzoylpropionate, stannous crotonate, stannous tropate, stannous p-bromobenzoate, stannous palmitooleate, stannous cinnamate and stannous salts of phenylacetic acid; iron, manganese, or cobalt salts of the abovementioned carboxylic acids; complex salts of tetraalkyl titanates and dialkyl titanates; and organosiloxytitanates.

The amount of component (D) in the present composition is sufficient to cure the composition. Typically, the amount of component (D) is from 0.0001 to 10 parts by weight per 100 parts by weight of component (A).

The composition of the present invention can be prepared by uniformly mixing the abovementioned components (A) through (D) in the absence of moisture. There are no particular restrictions on the order of mixing. However, because the polymer of Component (A) is typically a solid, the present coating agent composition is preferably prepared by dispersing or dissolving Component (A) in component (B), and then combining the resulting mixture with the other components.

The composition of the present invention described above can be stored for a long period of time in the absence of moisture. In the presence of moisture, either at room temperature or under heating, the composition cures to form a coating film which is superior in terms of water-repellent characteristics, wear resistance and resistance to organic solvents. Accordingly, the composition of the present invention is useful in applications requiring such properties, such as optical materials, sliding parts in electrical or electronic parts, anti-soiling coating agents, and coating agents used for stripping or mold release.

EXAMPLES

The following examples are presented to further illustrate the coating agent composition of the present invention, but are not to be considered as limiting the invention, which is delineated in the appended claims. In the examples, Me denotes a methyl group. Also, the water-repellent properties of cured coating films were evaluated by measuring the contact angle of water on the films using a contact angle gauge (manufactured by Kyowa Kaimen Kagaku K.K.).

Reference Example 1

20 g of a polycarbonate copolymer of bisphenol A and a diallylbisphenol (copolymer ratio: 10:2) having a number average molecular weight of 10,000, wherein the diallylbisphenol has the formula:

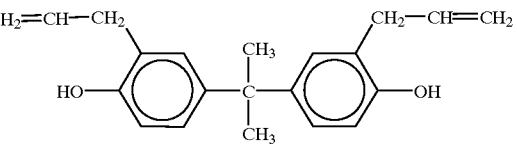

was placed in a reaction vessel and was dissolved in 100 g of chlorobenzene. A complex of chloroplatinic acid and divinyltetramethyldisiloxane was added to this solutin in an amount such that the amount of platinum metal was 30 ppm. Next 3.0 g of methyldimethoxysilane $MeSiH(OMe)_2$ was added dropwise under agitation. Following the completion of this dropwise addition, a hydrosilylation reaction was performed by stirring the mixture for 1 hour at 60° C. Then, the system was heated to 100° C. and the excess methyldimethoxysilane was distilled away, thus producing a chlorobenzene solution (solid content: 20 wt %) of a polycarbonate containing units having formula B1 and units having formula B2:

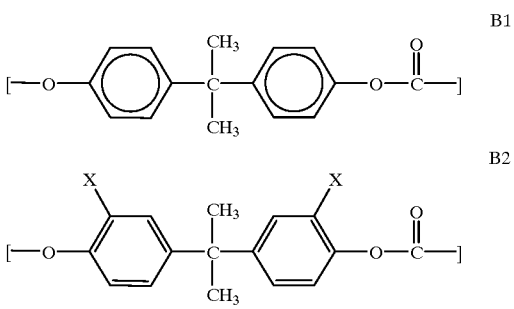

where X is $—CH_2CH_2CH_2SiMe(OMe)_2$. The mole ratio of the units having formula B1 to the units having formula B2 units was 10:2.

Example 1

0.8 g of methyltrimethoxysilane and 0.16 g of dibutyltin dilaurate were added to a mixture consisting of 4 g of the polycarbonate obtained in Reference Example 1 and 16 g of chlorobenzene. These ingredients were then mixed to produce a coating agent composition.

The curable polymer composition was applied to the surface of a flat, smooth glass plate using a spin coater and was then heated for 1 hour at 120° C. to give a transparent cured coating film. The contact angle of water on the cured coating was 98 degrees. The pencil hardness of the cured coating, determined using the method stipulated in JIS K5400, was 3H. Moreover, when a drop of toluene was applied to the surface of the cured coating film and then immediately wiped away with paper, no mark remained.

Furthermore, when the coating film was rubbed with No. 300 sandpaper, no scratching occurred.

Example 2

20.8 g of methyltri(methylethylketoxime)silane and 0.16 g of dibutyltin dilaurate were added to a mixture consisting of 4 g of the polycarbonate obtained in Reference Example 1 and 16 g of chlorobenzene. These ingredients were then mixed to produce a coating agent composition.

The coating agent composition was applied to the surface of a flat, smooth glass plate using a spin coater and was then allowed to stand for one week at room temperature to give a transparent cured coating film. The contact angle of water on the cured coating film was 97 degrees. Furthermore, the pencil hardness of the cured coating was, determined using the method stipulated in JIS K5400, was 3H.

Comparative Example 1

0.16 g of dibutyltin dilaurate was added to a mixture consisting of 4 g of the polycarbonate obtained in Reference Example 1 and 16 g of chlorobenzene. These ingredients were then mixed to produce a coating agent composition.

The coating agent composition was applied to the surface of a flat, smooth glass plate using a spin coater and was then allowed to stand for one week at room temperature to give a transparent cured coating film. The contact angle of water on the cured coating film was 97 degrees. The pencil hardness of the cured coating, determined using the method stipulated in JIS K5400, was 1H. Moreover, when a drop of toluene was applied to the surface of the cured coating and then immediately wiped away with paper, a white mark remained.

Comparative Example 2

A coating agent composition was prepared as in Example 1, except that a mixture consisting of 16 g of toluene and 4 g of a methylpolysiloxane resin, consisting of 80 mol % siloxane units expressed by the formula $(CH_3)SiO_{3/2}$ and 20 mol % siloxane units expressed by the formula $(CH_3)_2SiO_{2/2}$, was used instead of the chlorobenzene solution of the polycarbonate obtained in Reference Example 1.

The silicone composition was applied to the surface of a flat, smooth glass plate using a spin coater and was then allowed to stand for one week at room temperature to give a transparent cured coating film. The contact angle of water on the cured coating film was 97 degrees. The pencil hardness of the cured coating, determined using the method stipulated in JIS K5400, was 1H. Moreover, when the cured coating film was rubbed with No. 300 sandpaper, scratching and whitening were seen.

That which is claimed is:

1. A coating agent composition, comprising:
    (A) 100 parts by weight of a polymer having at least two alkoxysilyl groups, wherein the polymer has a number average molecular weight of 500 to 500,000, the polymer has a principal chain comprising a polycarbonate or a polyarylate, and the alkoxysilyl groups in the polymer have the formula:

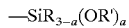

wherein R is a substituted or unsubstituted monovalent hydrocarbon group having 1 to 10 carbon atoms, R' is a substituted or unsubstituted monovalent hydrocarbon group having 1 to 8 carbon atoms, and a is from 1 to 3;
    (B) 50 to 2,000 parts by weight of an organic solvent;
    (C) 1 to 90 parts by weight of an organosilane, wherein the organosilane is a compound having the formula $R''_e SiY_{4-e}$ or a partially hydrolyzed condensate thereof, wherein R'' is a substituted or unsubstituted monovalent hydrocarbon group or a hydrogen atom, Y is a hydrolyzable group, and e is from 0 to 2; and
    (D) a cure catalyst in an amount sufficient to cure the composition.

2. The composition according to claim 1, wherein the principal chain of component (A) comprises a polycarbonate.

3. The composition according to claim 2, wherein the polycarbonate contains constituent units having the formula:

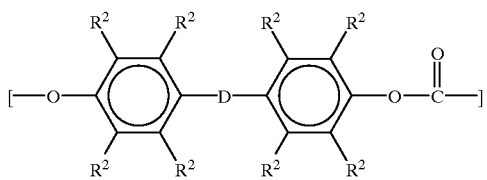

wherein $R^2$ is selected from the group consisting of hydrogen atoms, halogen atoms, monovalent hydrocarbon groups having 1 to 4 carbon atoms, and monovalent hydrocarbon groups having 1 to 4 carbon atoms and containing at least one alkoxysilyl group; and D is selected from the group consisting of divalent hydrocarbon groups having 1 to 20 carbon atoms, —O—, —S—, —CO—, —SO$_2$—, and divalent hydrocarbon groups having 1 to 20 carbon atoms and containing at least one alkoxysilyl group.

4. The composition according to claim 3, wherein at least 50 mole % of the groups represented by $R^2$ are hydrogen atoms.

5. The composition according to claim 3, wherein the polycarbonate is prepared by reacting a compound selected from the group consisting of phosgene, a carbonic acid diester, and a polycarbonate oligomer with a dihydric phenol having the formula:

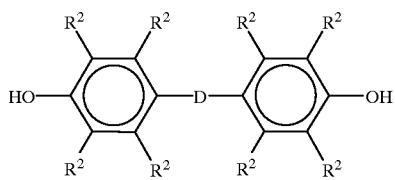

wherein $R^2$ is selected from the group consisting of hydrogen atoms, halogen atoms, monovalent hydrocarbon groups having 1 to 4 carbon atoms, and monovalent hydrocarbon groups having 1 to 4 carbon atoms and containing at least one alkoxysilyl group; and D is selected from the group consisting of divalent hydrocarbon groups having 1 to 20 carbon atoms, —O—, —S—, —CO—, —SO$_2$—, and divalent hydrocarbon groups having 1 to 20 carbon atoms and containing at least one alkoxysilyl group.

6. The composition according to claim 5, wherein the dihydric phenol is 2,2-bis(4-hydroxyphenyl)propane or 1,1-bis(4-hydroxyphenyl)cyclohexane.

7. The composition according to claim 1, wherein the principal chain of component (A) comprises a polyarylate.

8. The composition according to claim 7, wherein the polyarylate contains constituent units having the formula:

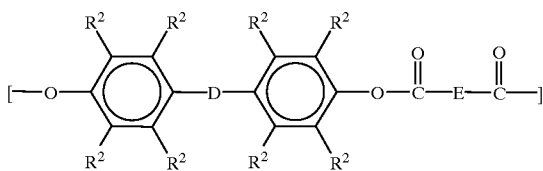

wherein R² is selected from the group consisting of hydrogen atoms, halogen atoms, monovalent hydrocarbon groups having 1 to 4 carbon atoms, and monovalent hydrocarbon groups having 1 to 4 carbon atoms and containing at least one alkoxysilyl group; and D is selected from the group consisting of divalent hydrocarbon groups having 1 to 20 carbon atoms, —O—, —S—, —CO—, —SO₂—, and divalent hydrocarbon groups having 1 to 20 carbon atoms and containing at least one alkoxysilyl group; and E is a substituted or unsubstituted divalent hydrocarbon group having 1 to 20 carbon atoms or a divalent hydrocarbon group having 1 to 20 carbon atoms and containing at least one alkoxysilyl group, provided that at least 50 mole % of the groups represented by E are aromatic hydrocarbon groups.

9. The composition according to claim 8, wherein the polyarylate is prepared by reacting an aromatic dicarboxylic acid with a dihydric phenol compound having the formula:

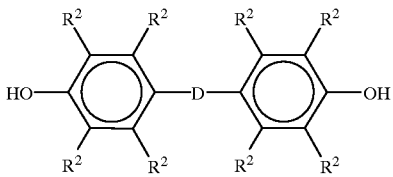

wherein R² is selected from the group consisting of hydrogen atoms, halogen atoms, monovalent hydrocarbon groups having 1 to 4 carbon atoms, and monovalent hydrocarbon groups having 1 to 4 carbon atoms and containing at least one alkoxysilyl group; and D is selected from the group consisting of divalent hydrocarbon groups having 1 to 20 carbon atoms, —O—, —S—, —CO—, —SO₂—, and divalent hydrocarbon groups having 1 to 20 carbon atoms and containing at least one alkocysilyl group.

10. The composition according to claim 9, wherein the dihydric phenol is 2,2-bis(4-hydroxyphenyl)propane or 1,1-bis(4-hydroxyphenyl)cyclohexane.

11. The composition according to claim 1, wherein the amount of Component (B) is from 100 to 1000 parts by weight per 100 parts by weight of Component (A).

12. The composition according to claim 1, wherein e in the formula for the organosilane of component (C) is 1.

13. The composition according to claim 1, wherein Component (C) is present in an amount from 1 to 60 parts by weight per 100 parts by weight of Component (A).

14. The composition according to claim 1, wherein component (D) is a condensation reaction catalyst.

15. A method of preparing a coating agent composition, comprising mixing:

(A) 100 parts by weight of a polymer having at least two alkoxysilyl groups, wherein the polymer has a number average molecular weight of 500 to 500,000, the polymer has a principal chain comprising a polycarbonate or a polyarylate, and the alkoxysilyl groups in the polymer have the formula:

$$-SiR_{3-a}(OR'')_a$$

wherein R is a substituted or unsubstituted monovalent hydrocarbon group having 1 to 10 carbon atoms, R' is a substituted or unsubstituted monovalent hydrocarbon group having 1 to 8 carbon atoms, and a is from 1 to 3;

(B) 50 to 2,000 parts by weight of an organic solvent;

(C) 1 to 90 parts by weight of an organosilane, wherein the organosilane is a compound having the formula $R''_e SiY_{4-e}$ or a partially hydrolyzed condensate thereof, wherein R'' is a substituted or unsubstituted monovalent hydrocarbon group or a hydrogen atom, Y is a hydrolyzable group, and e is from 0 to 2; and (D) a cure catalyst in an amount sufficient to cure the composition.

16. The method according to claim 15, wherein the step of mixing is carried out by first dispersing or dissolving Component (A) in Component (B).

17. A coating material prepared by curing the composition according to claim 1.

* * * * *